March 4, 1969   J. C. LAWRENCE   3,430,718
ROLLER CUTTER FOR ROTARY DRILLING APPARATUS
Filed Feb. 28, 1967   Sheet 1 of 2

INVENTOR.
JAMES C. LAWRENCE
BY
ATTORNEY

INVENTORS
JAMES C. LAWRENCE

United States Patent Office 3,430,718
Patented Mar. 4, 1969

3,430,718
ROLLER CUTTER FOR ROTARY
DRILLING APPARATUS
James C. Lawrence, Seattle, Wash., assignor to Ingersoll-Rand Company, New York, N.Y., a corporation of New Jersey
Filed Feb. 28, 1967, Ser. No. 632,132
U.S. Cl. 175—343                                        11 Claims
Int. Cl. E21b 9/12; E21c 13/01, 13/02

ABSTRACT OF THE DISCLOSURE

A rock drilling roller cutter including a circumferential cutting edge located in a plane which intersects the axis of the cutter at an oblique or acute angle. Also, a cutter having a pair of circumferential cutting edges located in planes intersecting each other and crossing the cutter axis at oblique or acute angles.

Background of invention

This invention relates to drilling apparatus and has more particular reference to the provision of a new and improved roller cutter for rotary drilling apparatus.

Conventionally, rotary drilling apparatus, and particularly rotary drilling apparatus for boring relatively large diameter holes and tunnels, generally includes a plurality of roller cutters. These roller cutters are usually formed of either conical, cylindrical, or disc configuration and are provided on their circumferences with pluralities of spaced cutting points, frequently formed from embedded carbide inserts, for concentrating load pressure on the rock or other ground being drilled to produce localized spalling in the latter.

Conical roller cutters are generally undesirable as their conical configuration is not conducive to sturdy bearing construction. Cylindrical roller cutters, due to their elongated construction, require a large number of cutting points for cutting the ground area that they cover. The provision of this large number of cutting points increases the complexity and cost of cylindrical roller cutters and also increases the operating load that must be provided for obtaining satisfactory drilling with such roller cutters. Conventional disc roller cutters overcome the aforementioned disadvantages of conical and cylindrical roller cutters, but each cut only an undesirably small kerf.

In addition to the aforegoing, conventional roller cutters, whether they be formed of conical, cylindrical, or disc construction, generally suffer from tracking. Tracking, the following of one cutting point into the indentation made by a preceding cutting point, is objectionable in that it reduces drilling efficiency.

Summary of invention

An object of the present invention is to provide a new and improved disc roller cutter which is particularly constructed and arranged to eliminate tracking and to form a kerf substantially larger than that possible with conventional disc roller cutters.

Another object of the invention is to provide a new and improved disc roller cutter of the type set forth which, although highly efficient and dependable in operation, is relatively simple and economical in construction.

The aforegoing objects, and those other objects and advantages of the invention which will be apparent from the following description taken in connection with the accompanying drawings, are obtained by the provision of a new and improved roller cutter for rotary drilling apparatus, comprising a supporting shaft, and first and second rotatable cutter bodies mounted on the supporting shaft. The first cutter body includes a first circumferential cutting edge and is mounted on the supporting shaft such that this first cutting edge is generally in a plane intersecting the axis of the supporting shaft at an acute angle. The second cutter body includes a second circumferential cutting edge and is mounted on the supporting shaft such that this second cutting edge is generally in a plane intersecting the axis of the supporting shaft at an acute angle and converging towards the plane of the first cutting edge. The cutter bodies are fixed relative to one another whereby the planes of their cutting edges maintain a predetermined angular relationship throughout the rotation of the cutter bodies; and the cutting edges, themselves, preferably intersect.

Description of preferred embodiments

Figure 1:
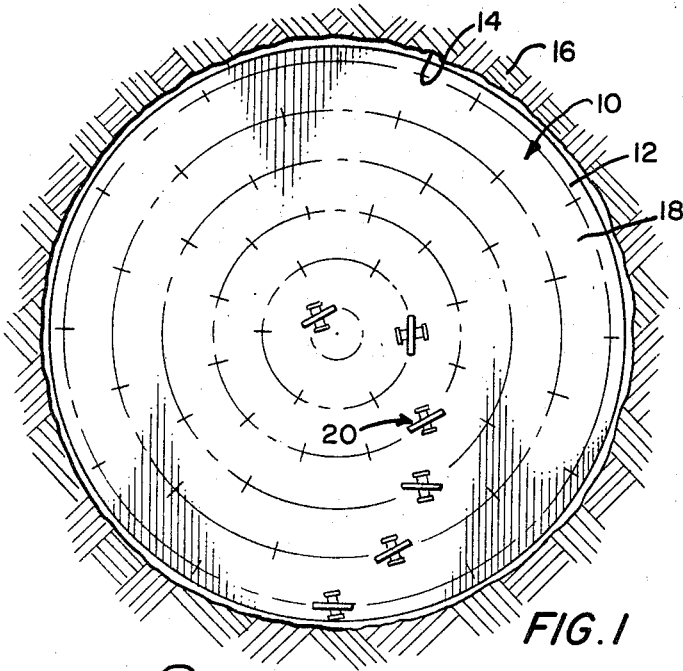
FIG. 1 is a schematic, partial view of a rotary tunnel boring apparatus provided with a plurality of roller cutters which are each designated generally as 20.

Referring more particularly to the drawings wherein similar reference characters designate corresponding parts throughout the several views, FIG. 1 schematically illustrates a partial view of a rotary tunnel boring apparatus designated generally as 10 which includes a cylindrical support 12 shown located within a hole or tunnel 14 in the ground 16. The leading face 18 of the support 12 carries a plurality of disc roller cutters 20 which are arranged in a series of concentric annular rows. The support 12 is rotatable by a driving motor (not shown) and is advanced axially in the tunnel 14 by suitable conventional apparatus (not shown) which is connected to the support 12 to supply axial thrust to the latter. The rotary tunnel boring apparatus 10 may include a pilot drill (not shown) for providing a pilot hole in advance of the support 12.

Figure 2:
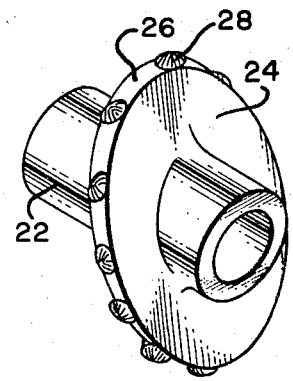
FIG. 2 is an enlarged perspective view of one of the roller cutters shown on the tunnel boring apparatus in FIG. 1.
Figure 3:
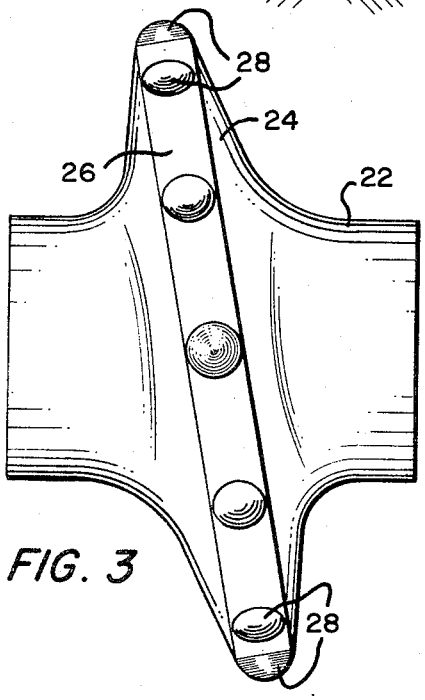
FIG. 3 is an enlarged elevational side view of the roller cutter illustrated in FIG. 2.
Figure 4:
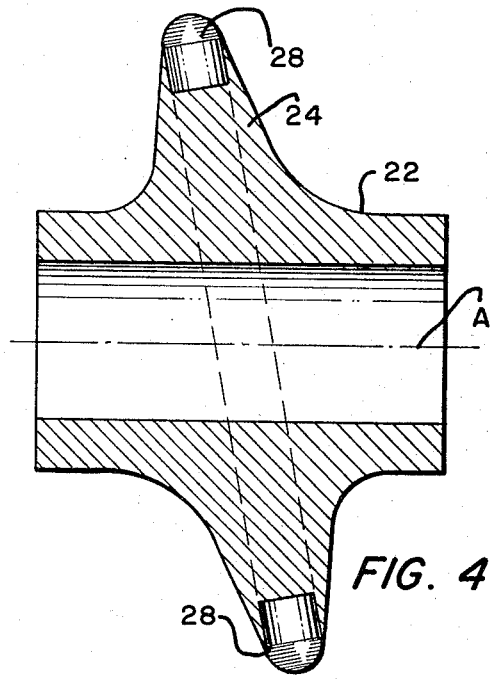
FIG. 4 is an elevational sectional view of the roller cutter shown in FIGS. 2 and 3.

FIGS. 2 through 4 illustrate the details of the construction of the disc roller cutters 20 on the support 12. As shown in FIGS. 2 through 4, each of the disc roller cutters 20 essentially comprises an annular supporting shaft 22 and a disc shaped cutter body 24 which is formed integrally with the supporting shaft 22 and circumferentially therearound. The supporting shaft 22 is adapted to be mounted upon the support 12 for free rotation relative to the latter on bearings (not shown) carried by the support 12 which are internally received by the opposing ends of the supporting shaft 22.

The cutter body 24 includes a relatively narrow, circumferential rim or edge 26 which extends continuously around the cutter body 24. A single row of aligned cutting points 28, preferably formed from embedded carbide inserts which are located at equally spaced intervals, is carried by the circumferential rim 26 and forms the cutting edge of the disc roller cutter 20. The cutter body 24 is formed at an oblique or non-perpendicular angle to the longitudinal axis A of the supporting shaft 22 such that the circumferential rim 26, and hence the cutting edge formed by the cutting points 28, extend around the supporting shaft 22 at a similar oblique or non-perpendicular angle relative to the longitudinal axis A of the supporting shaft 22. This disposition of the circumferential rim 26 at an oblique angle to the longitudinal axis A of the supporting shaft 22, as will be readily appreciated, both locates the cutting points 28 to prevent tracking and enables the disc roller cutter 20 to cut a kerf substantially wider than the width of the circumferential rim 26.

In the operation of the rotary tunnel boring apparatus 10, the rotation of the support 12 by its driving motor (not shown), with the disc roller cutters 20 in engagement with the face of the ground to be drilled, provides conjoined rotation of the disc roller cutters 20. During this rotation of the disc roller cutters 20, the cutting points 28 on each of the latter operate to provide a kerf in the face of the ground to be drilled, which kerf is substantially wider than the width of the cutting rim 26 of their respective disc roller cutters 20.

From the aforegoing, it will be seen that the disc roller cutter 20, while cutting a substantially larger kerf than is possible with most disc cutter rollers, eliminates tracking. It will be seen, moreover, that this disc roller cutter 20 is both highly efficient and dependable in operation and relatively simple and economical in construction.

Figure 5:
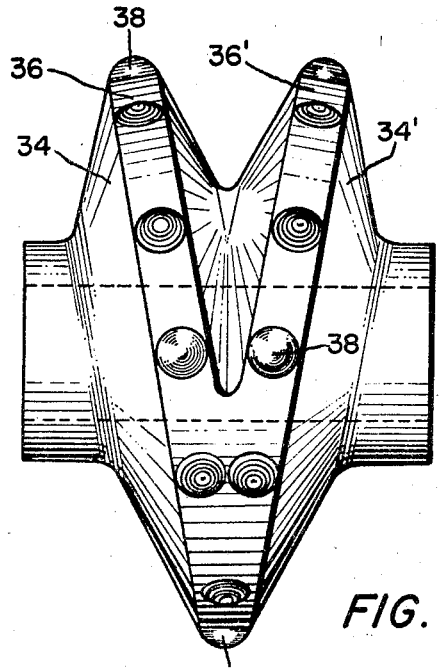
FIGS. 5 to 7 are elevational views similar to FIG. 3, but illustrating roller cutters 30, 40, and 50, respectively.

FIG. 5 illustrates a cutter embodiment 30 containing two disc-shaped bodies 34 and 34' having rims or edges 36 and 36' carrying respective rows of cutting points 38 and arranged in planes intersecting each other along a line extending tangentially to the rims 36 and 36' and non-intersecting with and spaced from the axis of the supporting shaft. The arrangement, as will be seen, constructs the cutter 30 such that it is generally V-shaped in axial section (i.e.: a section taken along the axis of the supporting shaft). In FIG. 5 the planes of the two rims 36 and 36' cross the axis of the cutter at equal angles which can be described as either oblique or acute angles.

Figure 6:
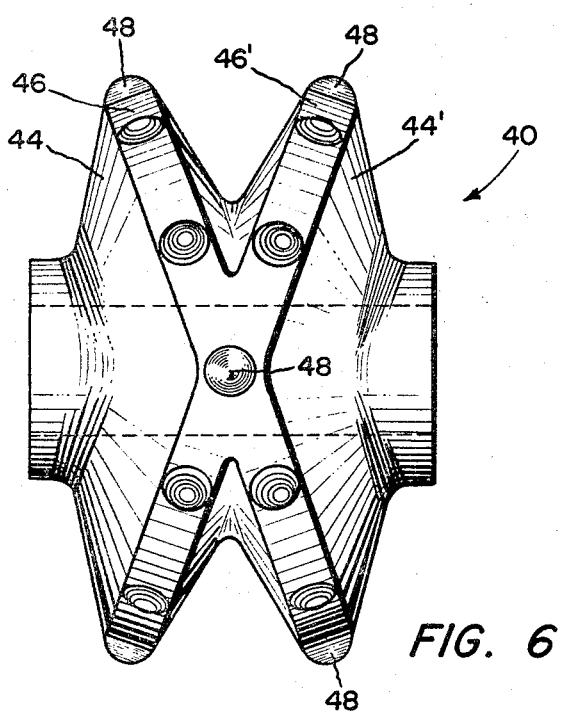

FIG. 6 illustrates a cutter embodiment 40 containing two disc-shaped bodies 44 and 44' having rims or edges 46 and 46' carrying cutting points 48. In this embodiment, the two rims 46 and 46' are located in planes which intersect each other along a line extending through, and perpendicular to, the axis of the supporting shaft of the cutter 40, thus providing the cutter with a generally X-shaped axial section. The two planes of the rims 46 and 46' cross the cutter axis at equal angles.

Figure 7:
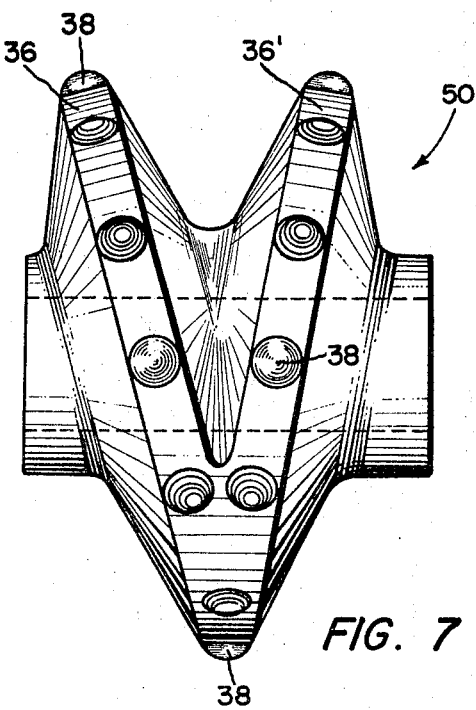

FIG. 7 shows an embodiment 50 which is similar to the FIG. 5 embodiment except the planes of the rims 36 and 36' cross the cutter axis at dissimilar or unequal angles.

It will be understood, that, while I have illustrated and specifically hereinbefore described several embodiments of my invention, my invention is not limited merely to the illustrated and described embodiments, but also contemplates other embodiments and variations utilizing the teachings of my invention.

It will also be seen from FIGS. 5, 6 and 7 that any given point on one disk is approximately the same distance from the axis of the bit as the corresponding point (in the same plane through the bit axis and on the same side of the bit) on the other disks. For example, the upper two points indicated by 48, 48 in FIG. 6.

Moreover, in practice the envelope of the bit is conical—that is, the bit body before cutting the V-slot to form two disks, will be conical in shape.

I claim:

1. A roller cutter for rotary drilling apparatus, comprising:
   a supporting shaft;
   a first rotatable cutter body having a first circumferential cutting edge and mounted on said supporting shaft such that said first cutting edge is generally in a plane intersecting the axis of said supporting shaft at an oblique angle; and
   a second rotatable cutter body having a second circumferential cutting edge and mounted on said supporting shaft such that said second cutting edge is generally in a plane intersecting the axis of said supporting shaft at an oblique angle and converging towards said plane of said first cutting edge;
   said cutter bodies being fixed relative to one another whereby said planes of said cutting edges maintain a predetermined angular relationship throughout the rotation of said cutter bodies.

2. A roller cutter according to claim 1, further comprising said planes of said first and second cutting edges intersecting the axis of said supporting shaft at equal angles.

3. A roller cutter according to claim 1, further comprising said planes of said first and second cutting edges intersecting the axis of said supporting shaft at unequal angles.

4. A roller cutter according to claim 1, further comprising said first and second cutting edges intersecting with one another.

5. A roller cutter for rotary drilling apparatus, comprising:
   a supporting shaft;
   a first rotatable cutter body having a first circumferential cutting edge and mounted on said supporting shaft such that said first cutting edge is at an oblique angle to the axis of said supporting shaft; and
   a second rotatable cutter body having a second circumferential cutting edge and mounted on said supporting shaft such that said second cutting edge is at an oblique angle to the axis of said supporting shaft and intersects with said first cutting edge.

6. A roller cutter according to claim 5, further comprising said first and second cutting edges intersecting such that said roller cutter is generally U-shaped in axial section.

7. A roller cutter according to claim 5, further comprising said first and second cutting edges intersecting such that said roller cutter is generally X-shaped in axial section.

8. A roller cutter according to claim 5, further comprising said first and second cutting edges being at equal oblique angles to the axis of said supporting shaft.

9. A roller cutter according to claim 5, further comprising said first and second cutting edges being at unequal oblique angles to the axis of said supporting shaft.

10. A roller cutter for rotary drilling apparatus, comprising:
    a supporting shaft adapted to be mounted on a rotary drilling apparatus;
    a first rotatable cutter body having a first circumferential cutting edge and mounted on said supporting shaft such that said first cutting edge is generally located in a plane intersecting the axis of said supporting shaft at an oblique angle; and
    a second rotatable cutter body having a second circumferential cutting edge and mounted on said supporting shaft such that said second cutting edge is generally located in a plane which intersects the plane of said first cutting edge;
    said planes of said first and second cutting edges intersecting the axis of said supporting shaft at equal angles.

11. A roller cutter for rotary drilling apparatus, comprising:
    a supporting shaft adapted to be mounted on a rotary drilling apparatus;
    a first rotatable cutter body having a first circumferential cutting edge and mounted on said supporting shaft such that said first cutting edge is generally in a plane intersecting the axis of said supporting shaft at an oblique angle; and a second rotatable cutter body having a second circumferential cutting edge and mounted on said supporting shaft such that said second cutting edge is generally in a plane intersecting the axis of said supporting shaft at an oblique angle and converging towards said plane of said first cutting edge;

said planes of said first and second cutting edges intersecting along a line intersecting said axis such that the roller cutter is generally X-shaped in axial section.

References Cited

UNITED STATES PATENTS

| | | | |
|---|---|---|---|
| 2,046,739 | 7/1936 | Harrington | 175—376 X |
| 2,052,034 | 8/1936 | Pennington | 175—376 X |
| 2,061,650 | 11/1936 | Catland | 175—343 |
| 2,749,093 | 6/1956 | Peter | 175—376 X |

JAMES A. LEPPINK, *Primary Examiner.*

I. A. CALVERT, *Assistant Examiner.*

U.S. Cl. X.R.

175—350, 354